United States Patent

Marzluf et al.

[11] Patent Number: 4,646,067
[45] Date of Patent: Feb. 24, 1987

[54] SECURITY BAR RACK

[75] Inventors: Werner Marzluf, Rheinstetten; Günter Ott, Waldbronn, both of Fed. Rep. of Germany

[73] Assignee: Maschinenfabrik Hellmut Geiger GmbH & Co. KG., Karlsruhe, Fed. Rep. of Germany

[21] Appl. No.: 512,762

[22] Filed: Jul. 11, 1983

[51] Int. Cl.[4] .............................................. G08B 13/00
[52] U.S. Cl. ................................... 340/550; 340/506; 340/691; 109/42; 200/61.93
[58] Field of Search ............... 340/691, 544, 545, 626, 340/650, 651, 652, 550, 501, 524, 525, 521, 506, 507, 510, 511, 568, 572; 376/153, 156; 109/21, 42, 41; 200/61.93

[56] References Cited

U.S. PATENT DOCUMENTS

| | | | |
|---|---|---|---|
| 2,578,556 | 12/1951 | Johnston | 340/550 |
| 2,636,163 | 4/1953 | Gardiner | 340/501 |
| 3,537,094 | 10/1970 | Hawkins et al. | 340/691 |
| 3,623,061 | 11/1971 | Mayhew | 340/550 |
| 3,924,256 | 12/1975 | Cohen | 340/691 |
| 4,100,537 | 7/1978 | Carlson | 340/626 |
| 4,155,083 | 5/1979 | Slaats et al. | 340/541 X |
| 4,350,978 | 9/1982 | Riccobono | 340/550 |
| 4,356,476 | 10/1982 | Healey et al. | 340/511 X |
| 4,399,434 | 8/1983 | Bielat | 340/691 X |

FOREIGN PATENT DOCUMENTS

| | | |
|---|---|---|
| 2802903 | 1/1979 | Fed. Rep. of Germany . |
| 7809516 | 9/1979 | Fed. Rep. of Germany . |
| 2925624 | 1/1981 | Fed. Rep. of Germany . |
| 3112183 | 10/1982 | Fed. Rep. of Germany . |
| 3128788 | 2/1983 | Fed. Rep. of Germany . |
| 3148277 | 6/1983 | Fed. Rep. of Germany . |

Primary Examiner—Glen R. Swann, III
Assistant Examiner—Jeffery A. Hofsass
Attorney, Agent, or Firm—Wenderoth, Lind & Ponack

[57] ABSTRACT

A security bar rack for installation in the inlets or outlets of water-treatment plants or power stations comprises a number of hollow tubes. A conductive indicator element with uninsulated external surfaces is stretched within each tube and extends over its entire length. Each indicator element is provided with a separate monitoring circuit which actuates a signal element in a way that a detectable alarm signal is emitted if any change takes place in the dielectric condition of the indicator element/tube assembly. In addition a second signal element is provided which is controlled by the monitoring circuit so as to produce a detectable signal to indicate that the device is in a state of readiness to produce an alarm signal.

4 Claims, 2 Drawing Figures

SECURITY BAR RACK

BACKGROUND OF THE INVENTION

This invention relates to a security bar rack for installation in the inlets or outlets of water-treatment plants or power stations which incorporates a number of hollow tubes filled with a non-conductive, preferably gaseous, mixture.

Security bar racks employing hollow tubes in which indicator elements in the form of wires are installed have been described in DE-OS No. 29 25 624 and DE-GM No. 78 09 516. If the hollow tube is cut or distorted, contact will then be made between the indicator element and the wall of the tube, and this actuates a monitoring device which causes a signal element to emit a visual and audible signal.

In order to satisfy practical requirements, these known embodiments of security bar racks require further improvement in order to ensure reliable monitoring while avoiding faults.

SUMMARY OF THE INVENTION

The subject of the present invention is thus to produce a security bar rack that on the one hand will provide for reliable monitoring of the bar rack with accurate indication of the location of any defect or breakage, while on the other hand there is a continuous indication that the monitoring device is in good working order and ready to produce an alarm signal.

The solution of this problem involves the use of a number of hollow tubes within which conductive indicator elements with uninsulated external surfaces are biased mechanically. A separate monitoring circuit is provided for each indicator element and this controls a first signal element which produces a detectable alarm signal if any change takes place in the dielectric condition existing in the indicator element/tube assembly, as well as a second signal element which produces a detectable signal to indicate that the device is in a state of readiness to produce an alarm signal.

The monitoring circuit can advantageously take the form of a D.C. amplifier which contains two resistances in series on its input side, with the indicator element connected between these two resistances. Any change in the geometric arrangement of the indicator element and the hollow tube, particularly direct contact between the indicator element and the internal wall of the tube, will then cause a change in the voltage division ratio provided by the two resistances and will thus actuate the alarm signal.

It may further be advantageous to install one of the resistances together with the indicator element directly in the security bar rack. This provides an additional precaution against deliberate interference with the monitoring circuit.

It is advantageous to fill the hollow tubes with a non-conductive gaseous medium. It is then possible to pressurize the interior of the tubes with the gaseous medium and to provide pressure-operated devices that will actuate the monitoring circuit in the event of a drop in pressure.

Another advantageous form of the device can have contact feelers extending laterally from the indicator elements, with which they are in electrical contact.

BRIEF DESCRIPTION OF THE DRAWINGS

Other features and advantages of the invention under consideration can be determined from the following detailed description of a preferred embodiment thereof, together with the enclosed drawings, wherein.

DETAILED DESCRIPTION OF THE INVENTION

Figure 1:
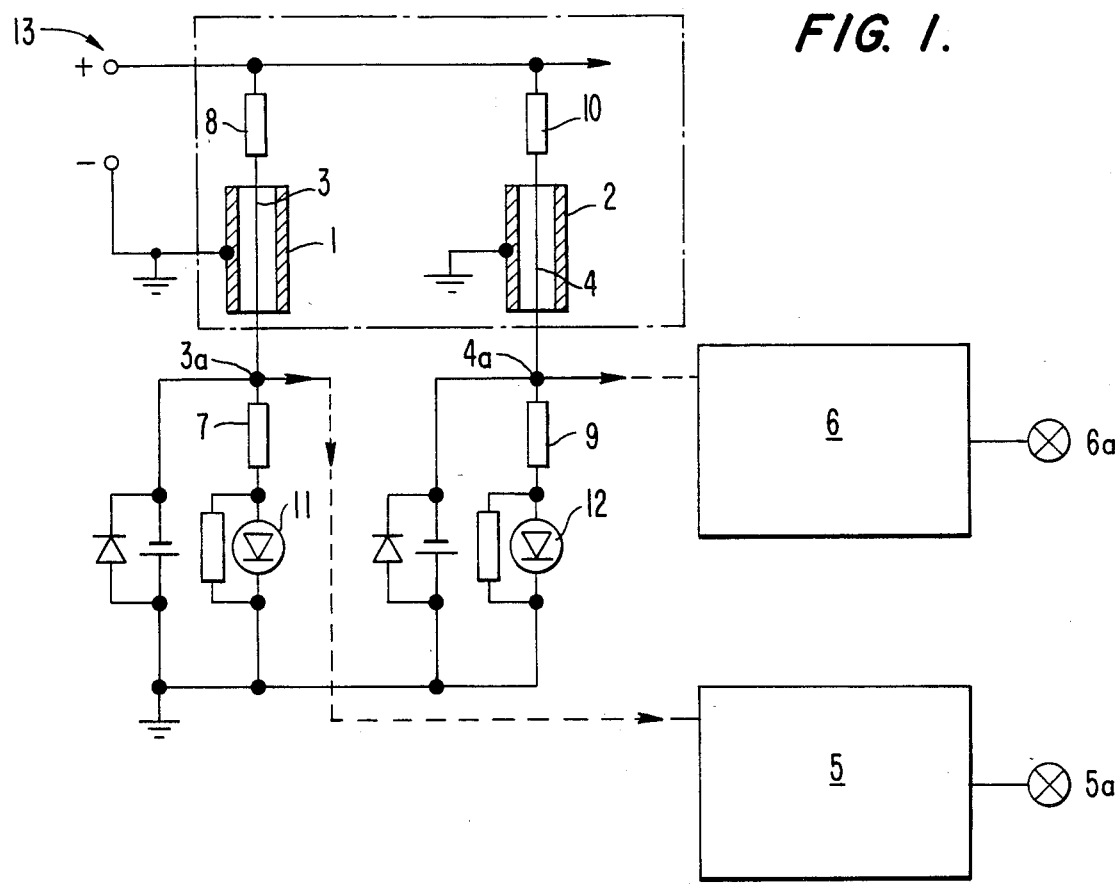
FIG. 1 is a basic circuit for a security bar rack according to the invention.

FIG. 1 shows portions of two hollow tubes 1,2 that form part of a bar rack of conventional design, indicated schematically within the dashed line box in FIG. 1, and that surround respective stretched indicator wires or sensor elements 3,4. Each indicator wire 3,4 is provided with a separate monitoring circuit 5,6 that contains a d.c. amplifier. Two resistance pairs 7,8; 9,10 are located at the inputs of respective of the monitoring circuits 5,6, and the indicator wires 3,4 are onnected between respective pairs of resistances. The resistances are in general of the same value and form a voltage divider, the ratio of which will be changed if contact is made between the indicator wires 3,4 and the inner wall surfaces of the respective tubes 1,2. Power is applied from 13 to inputs of wires 3,4 so that a given voltage is maintained at respective outputs 3a, 4a f wires 3,4.

Arranged in series with the indicator wires 3,4 and the resistances 7,9 are LEDs 11,12 which indicate readiness to produce an alarm signal, i.e. the existence of the given voltage at outputs 3a, 4a. If the indicator wires 3,4 break, or the power source is otherwise interrupted, the current flowing through the LEDs 11,12 is interrupted, such that the given voltage changes, and the fact that these are no longer illuminated indicates that the monitoring circuit is no longer operating. The d.c. amplifiers 5,6, which are of conventional design, each contain a switching relay which opens in the event of an alarm, and actuates a respective first signal element 5a,6a for producing an alarm signal. A second signal element is formed by the LEDs 11,12.

The amplifier inputs are in general designed for resistances in the range 500 to 1000 ohms between the hollow tubes 1,2 and the indicator wires 3,4. Higher resistances should not cause the alarms to be actuated. Resistances 8 and 10, together with indicator wires 3,4 are installed directly in the bar rack. The other circuit elements can be installed in the control centre, and can be connected to these by wires.

If in the event of damage to a tube 1, 2 or a wire 3, 4 there is electrical contact between the inner wall surface of the hollow tube 1 and the coaxial stretched indicator wire 3, 4, or other change in the dielectric condition of the geometric assembly thereof, and the d.c. voltage that is applied will disturb the voltage division ratio of the two resistances 7,8. As a result the voltage drop across the lower resistance 7, 8, i.e. at output 3a, 4a, will then become less. When this voltage drop falls below a critical value, the switching condition of the amplifier is reversed, and the corresponding relay is tripped which actuates the first signal element 5a,6a to produce an alarm.

The alarm is also actuated in the event of a power failure.

Figure 2:
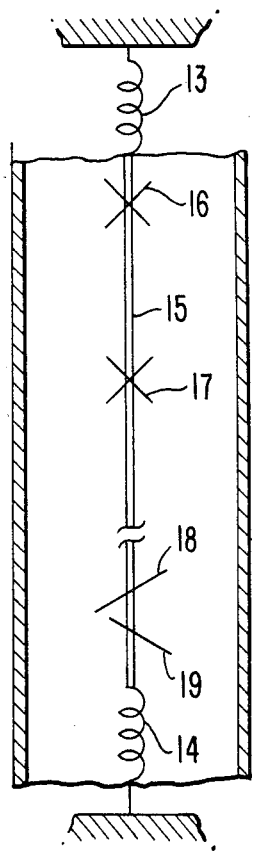
FIG. 2 is an isometric sectional view of a hollow tube with an indicator element.

FIG. 2 shows an indicator wire 15, supported by springs 13,14 at each end, and carrying contact wires 16,17 each arranged in the form of a cross, or 18,19 pointing in alternate directions. This increases the probability of contact being made with adjacent parts of the wall of the hollow tube 20.

The monitoring circuit can take various forms, including a capacitative sensor circuit which will be capable of detecting changes in the capacitance of the geometric arrangement formed by the indicator wires 3,4 which are held on insulated mounts, and the neighbouring wall surfaces of the respective tubes 1,2.

It may prove convenient to extend the monitoring circuit such that additional components or operating conditions are monitored by the same circuit. It would, for example, be possible to incorporate a limit position sensor to detect when the security bar rack has been lowered to, and is maintained at, its operational lowered position. Any attempt to raise the rack so as to obtain access would then also actuate the alarm. Another extension of the monitoring circuit could provide for contact sensors to be fitted to the cover plates on the security bar rack that provide access to the components forming the monitoring circuit, which then will actuate the alarm if there is any attempt to obtain unauthorized entry by interfering with the cover plates.

We claim:

1. A security bar rack for installation in an inlet or outlet of a facility such as a water treatment plant or a power station, said security bar rack comprising:
   a plurality of conductive hollow tubes connected to ground;
   a plurality of conductive sensor elements having uninsulated external surfaces, each said sensor element being stretched within a respective said hollow tube and extending throughout the entire height thereof, and each said sensor element having an input and having an output separate from the outputs of the other sensor elements, each said sensor element comprising a single uninterrupted electrically conductive line between said input and said output;
   power supply means connected to said inputs of said sensor elements for powering said sensor elements and providing voltage of a given value to said outputs of said sensor elements;
   a plurality of separate monitoring circuits, each said monitoring circuit being connected to said output of a single respective said sensor element and forming means for generating an indication of a change in the dielectric condition of the geometric assembly of said respective sensor element and the respective said hollow tube as a function of a change of said given voltage at said output;
   a plurality of first signal elements, each said first signal element being connected to a single respective said monitoring circuit for generating an alarm signal indicative of the respective said change in dielectric condition;
   a plurality of second signal elements, each said second signal element being connected to said output of a single respective said sensor element and forming means to produce a detectable signal representative of the existence of said given voltage at said output at all times during which the respective said sensor element is powered and in a state of readiness capable of indicating said change in dielectric condition; and
   each said second signal element being connected in parallel to the respective said monitoring circuit and first signal element;
   thereby forming a linear arrangement of independent pairs of first and second signal elements.

2. A security bar rack as claimed in claim 1, wherein each said monitoring circuit comprises a D.C. amplifier, and a series circuit, comprising two resistances with the respective said sensor element therebetween, connected to an input side of said amplifier.

3. A security bar rack as claimed in claim 2, wherein one of said resistances and said sensor element are installed in the security bar rack.

4. A security bar rack as claimed in claim 1, wherein each said sensor element comprises a wire having attached in electrical contact therewith a plurality of lateral contact wires.

* * * * *